United States Patent [19]

Sakakibara et al.

[11] Patent Number: 5,004,082
[45] Date of Patent: Apr. 2, 1991

[54] STARTING DEVICE OF AN AUTOMATIC TRANSMISSION FOR VEHICLE

[75] Inventors: Shiro Sakakibara, Toyokawa; Takashi Furuya, Chiryu, both of Japan

[73] Assignee: Aisin AW Co., Ltd., Anjo, Japan

[21] Appl. No.: 292,240

[22] Filed: Dec. 30, 1988

[30] Foreign Application Priority Data

Mar. 23, 1988 [JP] Japan .................................. 63-70158

[51] Int. Cl.⁵ ............................................ F16H 45/02
[52] U.S. Cl. .................................. 192/3.26; 192/3.28; 192/3.31; 192/57
[58] Field of Search .................... 192/3.26, 3.28, 3.31, 192/57, 48.3; 464/46

[56] References Cited

U.S. PATENT DOCUMENTS

| | | | |
|---|---|---|---|
| 2,267,334 | 12/1941 | Keller | 192/57 X |
| 2,640,572 | 6/1953 | O'Brien | 192/3.26 X |
| 2,891,640 | 6/1959 | Binder | 192/3.26 X |
| 3,064,455 | 11/1962 | Gros | 464/46 X |
| 3,118,292 | 1/1964 | Schroter et al. | 464/46 X |
| 3,152,675 | 10/1964 | Cadiou | 192/3.31 |
| 3,216,220 | 11/1965 | Schroter | 464/46 X |
| 3,625,323 | 12/1971 | Hetmann | 192/3.26 |
| 4,620,621 | 11/1986 | Kulczycki et al. | 192/3.31 |
| 4,624,650 | 11/1986 | Hiruma et al. | 464/46 X |
| 4,660,692 | 4/1987 | Sakakibara et al. | 192/3.31 |
| 4,673,071 | 6/1987 | Moroto et al. | 192/3.31 X |
| 4,733,761 | 3/1988 | Sakakibara | 192/3.31 X |
| 4,765,200 | 8/1988 | Koshimo | 192/3.26 X |
| 4,867,290 | 9/1989 | Macdonald et al. | 192/3.28 |

FOREIGN PATENT DOCUMENTS

| | | |
|---|---|---|
| 0164183 | 12/1985 | European Pat. Off. . |
| 1950211 | 4/1971 | Fed. Rep. of Germany ..... 192/3.26 |
| 31004 | 12/1969 | Japan ................................. 192/106.2 |
| 14761 | 4/1971 | Japan ................................. 192/106.2 |
| 0782338 | 9/1957 | United Kingdom . |

Primary Examiner—Rodney H. Bonck
Attorney, Agent, or Firm—Spencer & Frank

[57] ABSTRACT

A starting device for an automatic transmission for a vehicle includes a hydraulic coupling disposed between the output shaft of the engine and the input shaft of the automatic transmission. A lock-up clutch connects the output shafts of the engine and the output side of the hydraulic coupling, the output side of the hydraulic coupling being connected to the input shaft of the automatic transmission. A slip clutch is connected in series with the lock-up clutch, is disposed between the output shaft of the engine and the output side of the hydraulic coupling, and includes a plurality of friction plates and a biasing device for applying a predetermined biasing force to the plurality of friction plates to urge the friction plates together. Additionally, a cam mechanism is disposed in the power transmission path with the slip clutch at the output side of the hydraulic coupling, for generating an axial force proportional to the amount of torque transmitted through the power transmission path and for applying the torque to the plurality of friction plates of the slip clutch so that the slip clutch has a torque capacity proportional to the applied torque.

14 Claims, 12 Drawing Sheets

| ELEMENT POSITION | | C1 | C2 | 50 | B1 | B2 | F |
|---|---|---|---|---|---|---|---|
| P | | | | | | | |
| R | | | | | ○ | ○ | |
| N | | | | | | | |
| D | L | ○ | | ○* | | | ○ |
| | H | ○ | ○ | ○* | | | |
| S | L | ○ | | ○* | ○ | | ○ |
| | H | ○ | ○ | ○* | | | |

STARTING DEVICE OF AN AUTOMATIC TRANSMISSION FOR VEHICLE

BACKGROUND OF THE INVENTION

1. Field of the Invention

The present invention relates to a starting device of an automatic transmission for a vehicle, in particular, to a starting device which is suitable for an automatic transmission mounting a belt driven continuously variable transmission, in particular, a starting device having a hydraulic coupling (including torque converter) and a centrifugal type lock-up clutch for an automatic transmission of a vehicle.

2. Description of the Prior Art

Conventionally, with regard to an automatic transmission mounting a belt driven continuously variable transmission (CVT), as shown in the Japanese Laid Open Patent No. Sho-57-140956, an automatic transmission having a hydraulic coupling such as a torque converter and a fluid coupling, and a centrifugal type lock-up clutch have been proposed.

In general, a centrifugal type frictional clutch used for a lock-up clutch of a hydraulic coupling is composed of a weight, a retractor spring whose ends are supported by a pin and providing the weight with a pressing force opposing the centrifugal force, a shoe which can touch a case of the hydraulic coupling, and a main spring which is situated between the shoe and the retractor spring. The characteristic of the centrifugal frictional clutch is shown in FIG. 14.

Namely, in the case that rotation of the output side of the hydraulic coupling is below a certain rotational speed, a slit is made between the case and the shoe based on the retractor spring, and the centrifugal frictional clutch is in a disconnected condition (i.e., the no motion area A of FIG. 14). In this condition, torque from the engine is transmitted to an automatic transmission through the hydraulic coupling, so a vehicle starts smoothly. In the case that rotation of the output side of the hydraulic coupling is over a certain rotational speed, by centrifugal force the weight pushes the retractor spring, the shoe contacts with the case, and then torque transmission begins (i.e., the low speed area B). In the area B, the torque capacity increment ratio of the clutch becomes large because the shoe is pressed by centrifugal force on the weight and furthermore centrifugal force on the shoe itself is added. Due to this, fuel efficiency during low speed running is enhanced. Still further rotation of the output side of the hydraulic coupling increases, the weight contacts with the pin, centrifugal force action on the weight does not act on the shoe, and torque transmission is conducted based on centrifugal force action on the shoe itself (i.e., the medium speed area C). In the area C, the torque capacity increment ratio is relatively low, and torque vibration caused by knocking, etc., and shift shock are absorbed by slip of the clutch (torque limiter function). In the case that rotation of the output side of the hydraulic coupling yet increases, the main spring extends outwardly by centrifugal force, and centrifugal force developed by the main spring itself is added, so the lock-up torque curve in FIG. 14 becomes steep (i.e., the high speed area D). The curve labelled by the letter E in FIG. 12 represents the maximum torque of the engine.

Even in the case of the centrifugal lock-up clutch featuring a torque limiter function, when a high load exists and the rotation of the output side rises, for example at a time of down-shifting, a stick slip of the clutch occurs due to the increase of required clutch capacity and high load along with the rise of rotation, and as a result, smooth acceleration by kick down is hampered, particularly in the high speed area D and in a high speed side of the medium speed area C, shift shock occurs because the clutch capacity is too large.

On the other hand, in the case that the torque capacity of the clutch is set to be small, even under normal running conditions on flat roads, the lock-up clutch may frequently have slip (particularly in the low speed area B and the low speed side of the medium speed area C), and consequently fuel efficiency is lowered.

While a starting device employing a slip clutch whose slip ratio is controlled by microcomputer so that a vehicle can start smoothly has been proposed, a device of this type requires a complicated and intricate control device to detect vehicle load and rate of revolution of the engine. Furthermore, a response delay in the control device inevitably occurs depending on the starting situation, and such delay causes a matching deficiency between the operation of a driver, and consequently, the starting performance is lowered.

SUMMARY OF THE INVENTION

It is the primary object of this invention to provide a starting device used for an automatic transmission mounted in a vehicle made up of the combination of a centrifugal type lock-up clutch and a slip clutch, which are inexpensive devices, without requiring any complicated control devices and having improved fuel efficiency and improved driveability by absorbing steep load torque variations.

Referring to FIG. 1 to FIG. 3, for example, in starting devices ($100_1$), ($100_2$), ($100_3$) having a hydraulic coupling (40) and a centrifugal type lock-up clutch (50) connecting an output side (41) and an input side (42) of the hydraulic coupling (40), a slip clutch (110), which slips under the condition that the torque exceeds a certain value, is situated in series with the centrifugal type lock-up clutch (50).

As one example, the slip clutch (110), as shown in FIG. 1, is made up by a clutch disc (111), a clutch plate (112) and a coned or conical disc spring (113) applying a given biasing force to both the disc (111) and the plate (112), the slip clutch (110) having a certain torque capacity based on the given biasing force of the coned or conical disc spring (113).

As another example, a cam mechanism (120), as shown in FIG. 2 or FIG. 3, is situated in the power transmission path at the output side (41) of the hydraulic coupling (40). The cam mechanism (120) develops an axial force corresponding to the load torque, and the axial force developed from the cam mechanism (120) is applied to the slip clutch (110), so that the slip clutch (110) has a torque capacity corresponding to the load torque.

In particular, the cam mechanism (120) has an operation side cam (121) and an operated side cam (122) both of which can be relatively movable. With regard to the output side (41) of the hydraulic coupling (40), a turbine runner (41a) and a hub (41b) are structured to rotate relative to each other, while the operation side cam (121) is connected to the turbine runner (41a), and the operated cam side (122) is connected to the hub (41b). Furthermore, the cam mechanism (120) is situated in the slip clutch (110).

Based on the above structure, for example as shown in FIG. 11, when a vehicle starts, the centrifugal type lock-up clutch (50) is in an off condition, so torque from the engine is transmitted through the hydraulic coupling (40) to an automatic transmission, the vehicle starts smoothly based of oil flow of the hydraulic coupling (40) (refer to the lock-up OFF area K). When the rate of revolution at the output side (41) of the hydraulic coupling (40) reaches a predetermined rotational speed, the lock-up clutch (50) starts transmitting torque (refer to the lock-up starting point L-1), a torque capacity of the lock-up clutch (50) increases sharply due to centrifugal force on a weight and a shoe as shown in the lock-up torque capacity characteristic L, consequently the lock-up clutch (50) is under at comparatively low speed, and so fuel efficiency is increased. On the other hand, even if the lock-up clutch (50) is in a connected condition, in the case that large loads caused by kick-down, sudden braking and upshifting, etc. are applied to the output side (41), or vibration caused by knocking, etc. are applied to the input side (42), the slip clutch (110) slips, so that the above loads are smoothly absorbed. At this moment, as the slip clutch (110) has a clutch characteristic (M) which is approximately parallel to the rate of rotation of the output side, a vehicle runs smoothly by securely absorbing the above loads even during high speed running conditions.

Namely, in the lock-up ON area, a complete lock-up ON area (N) lies at the right side of the lock-up clutch torque capacity characteristic (L) and below the slip clutch torque capacity characteristic (M), and the area other than area (N) is a slipping area (O). Furthermore, the slipping area is divided into three areas: a slipping area of the centrifugal clutch (0-1), a slipping area of the centrifugal clutch and the slip clutch (0-2), and a slipping area of the slip clutch (0-3). In addition to the above, in FIG. 11, (R) represents a running load under the condition of normal running on flat roads, (E) means the maximum torque of the engine.

It is possible for the torque capacity of the slip clutch (110) to be set approximately constant regardless of the pressing force of the coned or conical disc spring (113), or to be set to correspond to the load torque as shown in FIG. 2 or FIG. 3.

In other words, when running at more than a predetermined speed (more than the lock-up starting point L-1), if the load torque is suddenly changed due to kick-down, up shift, knocking, etc., the slip clutch (110) slips, then power is transmitted through the hydraulic coupling (40) whose input side (42) and output side (41) rotate relative to each other, the turbine (41a), the cam mechanism (120) and the hub (41b) to the main body of the automatic transmission. At this moment, the cam mechanism (120) develops an axial force in correspondence with the load torque, so that the axial force is applied to the slip clutch (110), and then the slip clutch (110) increases torque capacity corresponding to the load torque. Accordingly, for example at the moment of kick down, the load torque once becomes zero. After that, the load torque sharply increases, the slip clutch (110) slips, and the torque is transmitted once through the hydraulic coupling (40). Due to this, the torque capacity of the slip clutch (110) increases corresponding to the load torque, so that power is transmitted with less slip or without slip. Namely, after the sharp load variation is absorbed once by the hydraulic coupling (40) automatically corresponding to the occurrence of slip, the torque capacity of the slip clutch (110) increases, and rotation from the direct coupling transmission path through the centrifugal type lock-up clutch (50) is transmitted to the main body of the automatic transmission.

The starting devices, as shown in the following embodiments, are suitable for an automatic transmission which is a belt driven continuously variable transmission. However, the invention is not limited to this, the starting devices also being suitable for an automatic transmission having gears for transmission.

Furthermore, although the above-mentioned devices are called "starting devices" as explained below, these devices do not always function at the moment of starting, and function all through the running time of a vehicle. The reason why the device is named "starting device" is that the device especially functions at the time of starting, so that the name "starting devices" does not limit the claimed rights.

The numbers and letters which are shown in the parentheses refer to the drawing(s), and do not limit the scope of the invention, which is referred to in detail in the following detailed description of the preferred embodiments.

DETAILED DESCRIPTION OF THE PREFERRED EMBODIMENTS

An example of the present invention applied to a continuously variable transmission shall now be described in detail, with reference to the drawings.

Figures 5, 6:
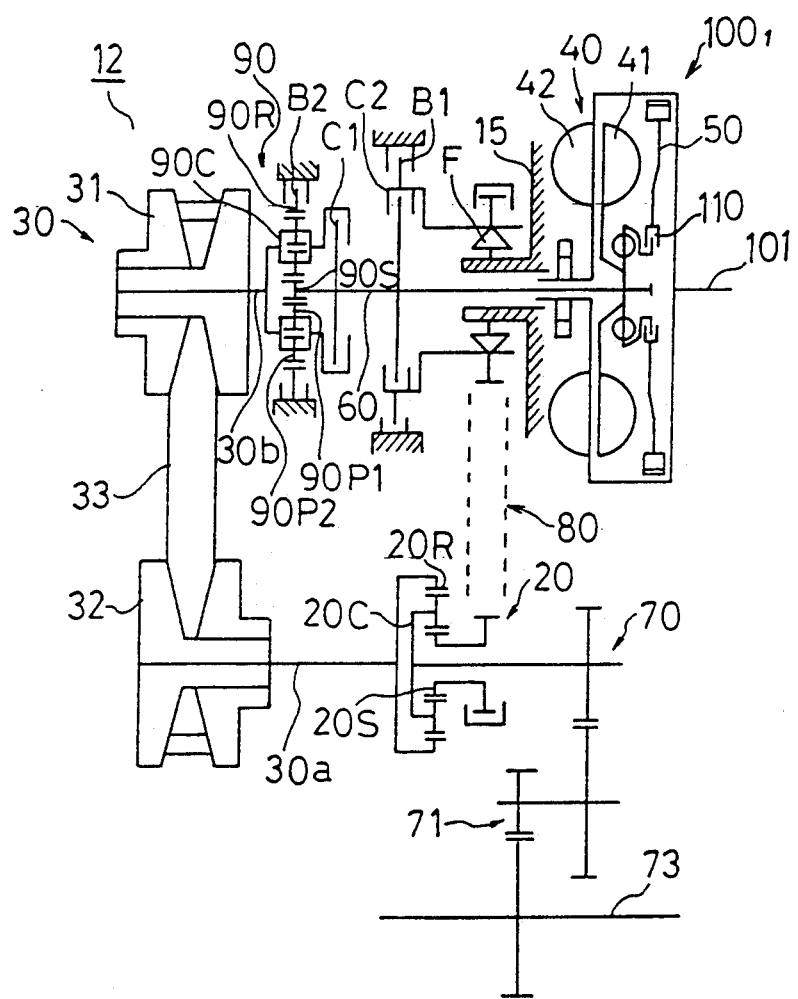
FIG. 5 is a schematic representation of a continuously variable automatic transmission in which the present invention is applied.
FIG. 6 is a table of operation for each element at each position of shifting.

First of all, explaining the schematic illustration of a continuously variable transmission 12, as shown in FIG. 5, it is provided with a single planetary gear mechanism 20, a belt driven continuously variable transmission device 30, a transfer device 80, an output member 70 having a reduction gear 71 and so on, a forward/reverse switching device 90 having a dual planetary gear mechanism, a hydraulic coupling 40, a starting device 100-1 having a centrifugal type lock-up clutch 50 and a slip clutch 110.

At the above planetary gear mechanism 20, a ring gear 20R interlock with a secondary shaft 30a of the device 30, a carrier 20C interlocks with an output member 70, a sun gear 20S is connected via the transfer device 80 to a low one-way clutch F and a low-coast and reverse brake B1 both of which make up a restraining means, and the sun gear 20S also is connected to an input shaft 60 through a high clutch C2.

A dual planetary gear mechanism or switching device 90 has a sun gear 90S connected to the input shaft 60, a carrier 90C connected to a primary shaft 30b of the belt driven continuously variable transmission device 30, and a ring gear 90R connecting a reverse brake B2.

Based on the above structure, all clutches, brakes and one-way clutches in the continuously variable transmission 12 operate at each shift position as shown in FIG. 6. The mark * shows operation of the lock-up clutch 50 due to centrifugal force at a required moment.

To explain in detail, a forward clutch C1 is in a connected condition, and the low one-way clutch F operates at the low speed mode L of the D range. In this condition, the rotation of the engine crank shaft 101 is transmitted to the input shaft 60 through the lock-up clutch 50 or the hydraulic coupling 40. Furthermore, the rotation is transmitted to the sun gear 90S directly and to the carrier 90C through the forward clutch C1. Consequently, the dual planetary gear mechanism 90 rotates together with the input shaft 60, and transmits the normal rotation to the primary shaft 30b of the belt driven continuously variable transmission device 30. At the belt driven continuously variable transmission device 30, the rotation shifted as required is transmitted from the secondary shaft 30a to the ring gear 20R of the single planetary gear mechanism 20. On the other hand, the sun gear 20S which is a supporting element against reaction force is restrained by the low one-way clutch F through the transfer device 80, and therefore, the rotation of the ring gear 20R is taken from the carrier 20C as decelerated rotation, and transmitted to the axle 73 through the reduction gear 71 and so on.

At the high speed mode H of the D range, the forward clutch C1 and also the high clutch C2 are in a connected condition. At this stage, the normal rotation shifted as required by the belt driven continuously variable transmission device 30, as already described, is taken from the output shaft 30a, and this normal rotation is input to the ring gear 20R of the single planetary gear mechanism 20. At the same time, the rotation of the input shaft 60 is transmitted to the sun gear 20S of the single planetary gear mechanism 20 through the high clutch C2 and the transfer device 80. Due to the above, the torque of the ring gear 20R and the sun gear 20S are combined at the planetary gear mechanism 20, and the combined torque is taken from the carrier 20C. At this time, the rotation opposing the reaction force is transmitted to the sun gear 20S through the transfer device 80, so certain positive torque is transmitted through the transfer device 80 without having a torque loop. This combined torque taken from the carrier 20C is transmitted to the axle 73 through the reduction gear 71 and so on.

With regard to the operation at the D range, torque is not transmitted when reverse torque is applied (or the engine brake is applied) because of the low one-way clutch F, while at the S range torque is transmitted when reverse torque is applied because of the operation of the low coast and reverse brake B1 in addition to the low one-way clutch F.

At the R range, the low coast and reverse brake B1 and the reverse brake B2 are in an operating condition. In this condition, rotation of the input shaft 60 is transmitted from the carrier 90C to the belt driven continuously variable transmission device 30 as a reverse rotation because the ring gear 90R is restrained. On the other hand, the sun gear 20S is restrained by the operation of the low coast and reverse brake B1, and the reverse rotation from the belt driven continuously variable transmission device 30 is decelerated by the planetary gear device 20 and taken from the output member 70.

Still further, the embodiment according to the present invention is explained with reference to FIG. 7.

The continuously variable automatic transmission 12 has a transmission case 15 separable in three portions. In this case 15, the input shaft 60 and the primary shaft 30b are situated coaxially (in series) with free rotation, then the first axle is formed, and an output shaft 30a of the belt driven continuously variable transmission device 30 and a gear shaft 70a are situated coaxially (in series) with free rotation, and then the second axle is formed. Furthermore, the following are located on the first axle: the lock-up clutch 50 composed of a centrifugal clutch, the hydraulic coupling 40, a starting device 100-1 including a slip clutch 110, the forward clutch C1, the high clutch C2, the low coast and reverse brake B1, the reverse brake B2, an operating section 10 composed of the low one-way clutch F, the dual planetary gear mechanism 90 constituting a forward/reverse switching device, and an oil pump 17. On the second axle, the single planetary gear mechanism 20 is situated.

Figure 1:
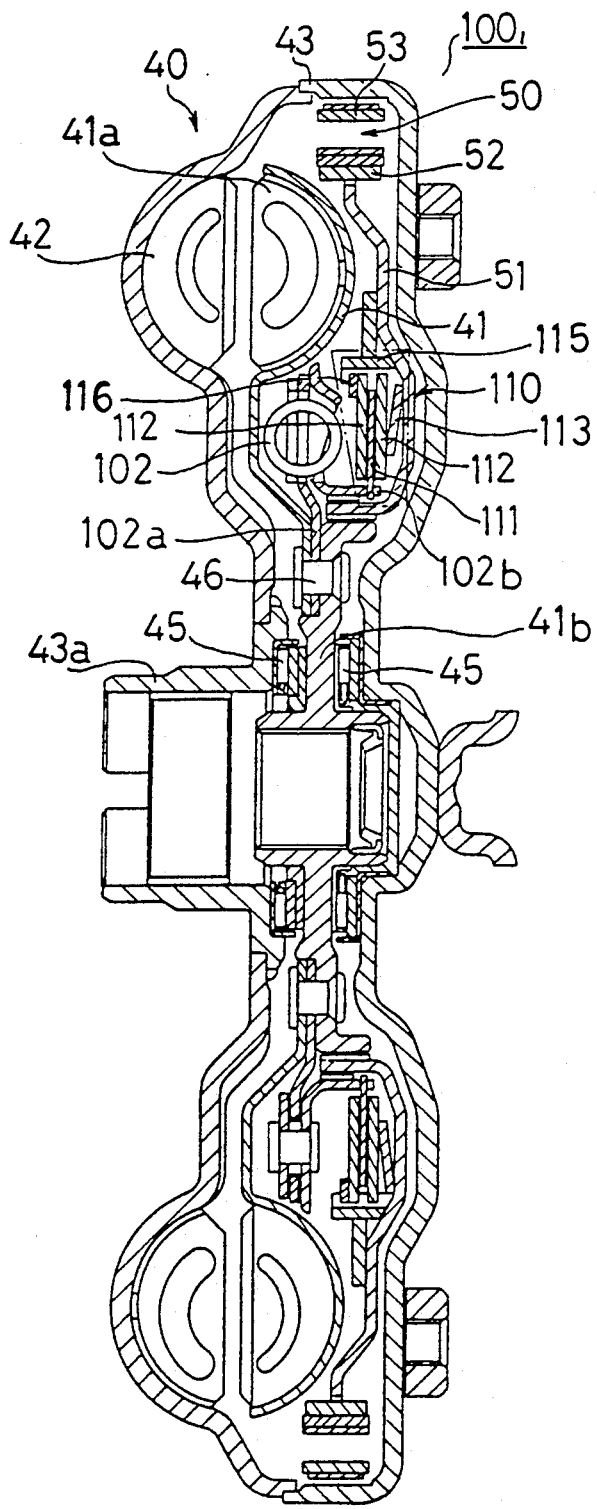
FIG. 1 is a cross-sectional view of a starting device related to the present invention.
Figure 7:
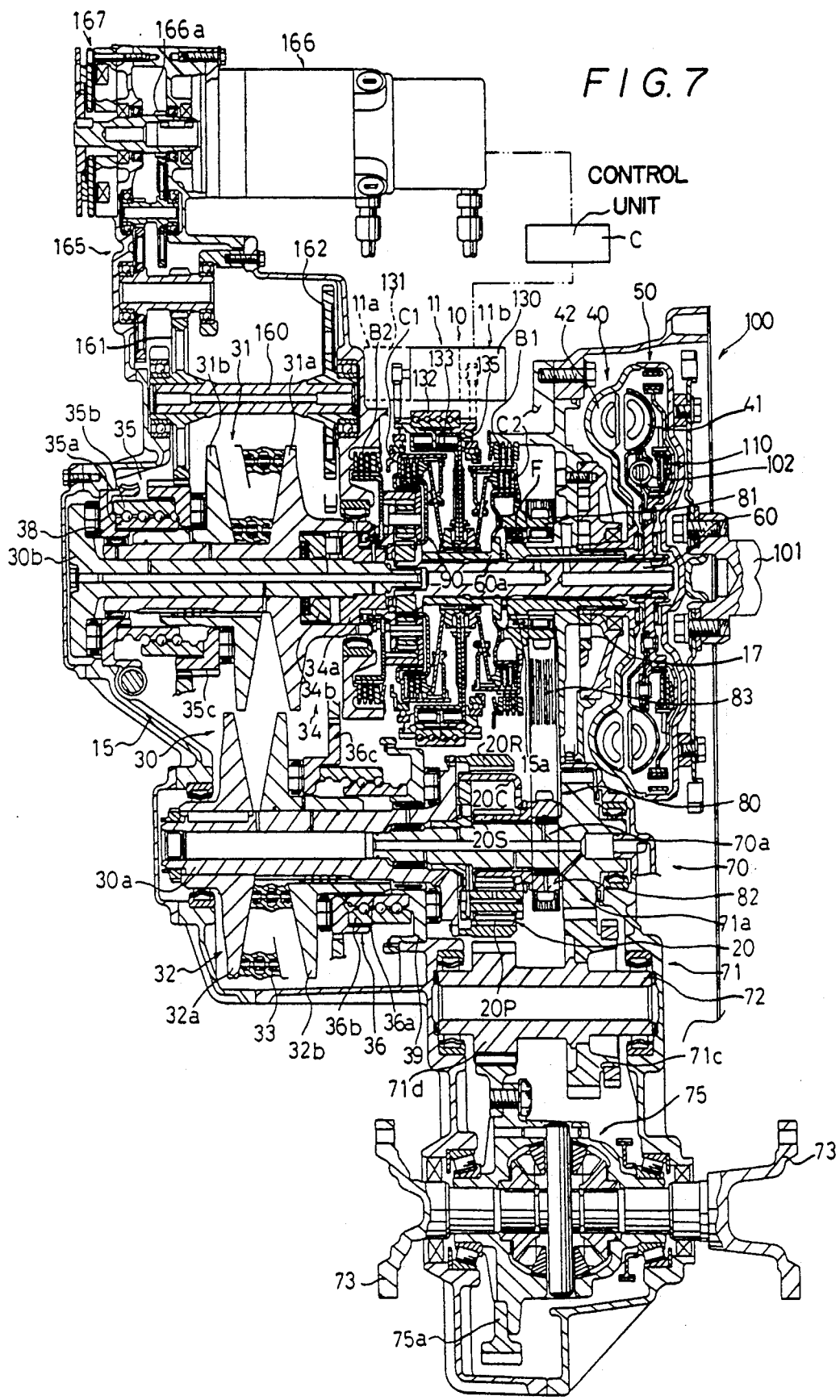
FIG. 7 is a complete cross-sectional view of the continuously variable automatic transmission.

Furthermore, explaining the starting device $100_1$ with reference to FIG. 1 in detail, the hydraulic coupling 40 has a coupling case 43 connecting to an engine crank shaft 101 (shown in FIG. 7). This case 43 has a pump impeller 42 constituting an input side, and also a rotor (refer to FIG. 7) of the hydraulic pump 17 is connected to a hub 43a of the case 43. A turbine runner 41a composing an output side 41 is installed against the pump impeller 42, and this runner 41a connects to a hub 41b by a pin 46. The hub 41b is fixed to and supported by a housing 43 through thrust bearings 45, 45, and this hub 41b is spline-coupled to the above input shaft 60. Furthermore, this hub 41b has a torsion damper 102 one of whose lugs 102a is connected by the pin 46, while the other lug 102b is extended to a slip clutch 110. The slip clutch 110 has a clutch hub 115, a clutch plate 112 connected to the same hub 115 and positioned by a snap ring 116, a clutch disc 111 connected to a lug 102b of the above damper, and a conical disc spring 113 providing a predetermined biasing force to these plates 112 and the disc 111. This slip clutch 110 has a given capacity of torque based on pressure of the conical disc spring 113. A disc 51 which fixes the clutch hub 115 and is held by the lug 102b of the damper, and the hub 41b with rotation allowed is extended radially. At the top of the disc 51, the centrifugal type lock-up clutch 50 is installed.

Figure 8:
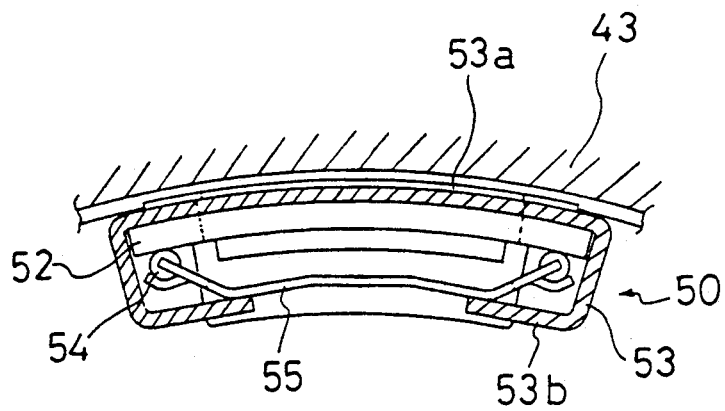
FIG. 8 is a cross-sectional view of a centrifugal type lock-up clutch.
Figure 11:
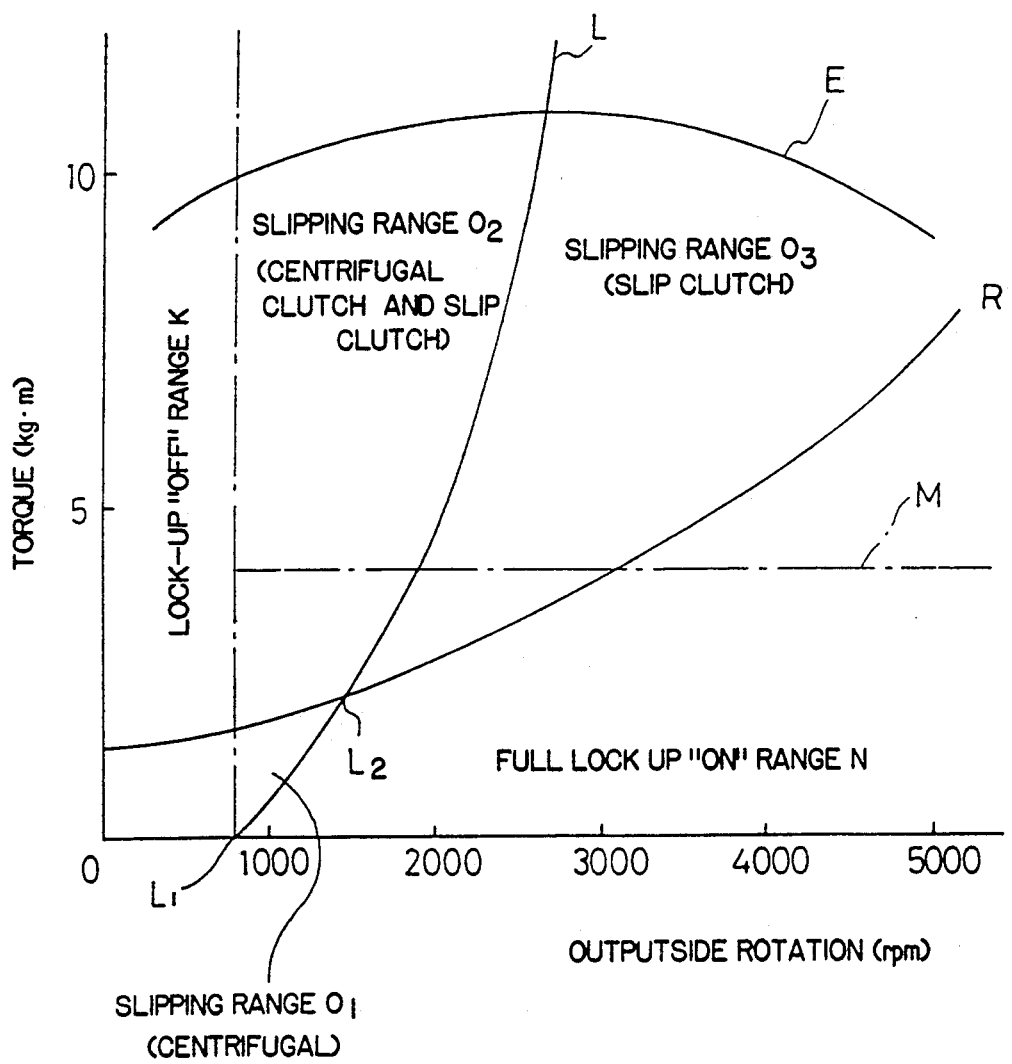
FIG. 11 is a graphical representation of the torque capacities of the clutches related to the present invention.

The centrifugal type lock-up clutch 50, as shown in FIG. 8, has a weight 52, a shoe 53 having a frictional member 53a and a retractor spring 55 comprising a leaf spring having both ends supported by pins 54 planted on the above-mentioned disc 51. This retractor spring 55 contacts a brim 53b inside the shoe 53, and exerts a retracting force on the weight 52 and the shoe 53 all the time. Consequently, with this lock-up clutch 50, once the centrifugal force is sufficiently high to actuate it, this force, with flexing of the retractor spring 55, brings the frictional member 53a into contact with the inside of the coupling case 43 and thereby transmits a torque. Due to the above structure, the lock-up 50 has, as shown in FIG. 11, a torque capacity featuring a sharply rising curve.

While a sleeve shaft 60a connects to the input shaft 60 by a spline, and at the engine side of the sleeve shaft 60a, projection 15a projects from a housing 15, the projection 15a supports an input sprocket 81 through a bearing. Furthermore, the hub of this sprocket 81 connects to the projection 15a through a free wheel or clutch F. A flange is disposed radially from the sprocket 81, and the inner side of the flange is connected to the input sleeve shaft 60a through the high clutch C2 composed of a multiple type clutch, while between the outer side of the flange and the case 15, the low coast and reverse brake B1 composed of a multiple type clutch is installed.

On the other hand, the sun gear 90S (refer to FIG. 5) of the dual planetary gear mechanism 90 is spline-coupled at an end section of the input shaft 60, and a flange is disposed radially from the end section. The end section of the input shaft 60 encloses the primary shaft 30b of the belt driven continuously variable transmission device 30, and the end section of the input shaft 60 and the primary shaft 30b are arranged in series. An adjusting cam mechanism 34 is fixed on the primary shaft 30b, and an input side cam 34a of the mechanism 34 is spline-coupled to the carrier 90C. Furthermore, the carrier 90C supports a first pinion 90PI and a second pinion 90P2, a connecting member is installed radially, and the forward clutch C1 made up by multiple discs is situated between an inner spline made on a brim of the connecting member and the outer spline of the flange. A supporting member fixing the ring gear 90R is supported on the carrier boss, and the reverse brake B2 is situated between a spline made on an outer brim of the supporting member and the spline made of the case 15.

An actuator unit 11 is situated at an area between the low coast and reverse brake B1 and the high-clutch C2, and between the reverse brake B2 and the forward clutch C1. The actuator unit 11 is constituted by a forward/reverse switching actuator 11a and a high/low mode switching actuator 11b. The actuator 11 has a motor 130 for the forward/reverse switching and a motor 131 for the high/low mode switching, which are separated from each other by a specified circumferential distance. These motors are rotating magnetic field motors such as commutator motors, step motors, etc., and electric motors such as servo motors and ultra sonic motors. These motors have a holding means such as an electromagnetic brake to hold a given rotational position of the motors. At the inner side of the motors 130 and 131, a female thread section is fixed on the case 15. The female thread section meshes with male thread sections via balls. The male thread sections for the forward/reverse switching device 11a and the high/low mode switching device 11b are situated side-by-side. Furthermore, these male thread sections mesh together with the above motors 130 and 131 through the output gear. Connecting members 133 and 135 are fixed to each male thread section. The connecting member 133 connected to the motor 130 for a forward/reverse switching device 11a engages the forward clutch C1 by an axial movement in one direction, and engages the reverse brake B2 by a movement in another direction. The connecting member 135 engages the high clutch C2 by an axial movement in one direction, and engages the low-coast and reverse brake B1 by an axial movement in another direction.

The belt driven continuously variable transmission device 30 has a primary pulley 31, a secondary pulley 32, and a belt 33 lapped around the pulleys 31 and 32. Both of the primary and secondary pulleys have stationary sheaves 31a, 32a and movable sheaves 31b, 32b. Furthermore, an adjusting cam mechanism 34 is installed on the primary pulley 31. A cam mechanism 34 has a rigid side cam 34a fixed on the primary shaft 30b, and a movable side cam 34b contacting the stationary sheave 31a with a pressing force through a conical disc spring so that the cam mechanism 34 provides axial force in proportion to the transmitting torque. The movable sheave 31b is supported on a hub of the stationary sheave 31a through a ball spline with only slide movement allowed, and a ball thread mechanism 35 is installed on the back side of the movable sheave 31b. With reference to the ball thread mechanism 35, a bolt section 35a is installed so that any rotational position of the bolt section 35a is set toward the case 15, and bolt section 35a is fixed on an adjusting member 38 which is connected to the input shaft 30b with no sliding movement allowed. A nut section 35b is connected to the movable sheave 31b through a thrust bearing so that the nut section 35b moves axially with the movable sheave 31b. With reference to the secondary pulley 32, a stationary sheave 32a is fixed on the output shaft 30a so that the stationary sheave 32a and the output shaft 30a are supported on the case 15 with rotation allowed, while the movable sheave 32b is supported on the output shaft 30a through a ball spline with only sliding movement allowed. Furthermore, a ball thread mechanism 36 is installed at the back side of the movable sheave 32b, a bolt section 36a is installed so that any rotational position of the bolt section 36a is set toward the case 15, and the bolt section 36a is fixed on an adjusting member 39 which is connected to the output shaft 30a with no sliding movement allowed. A nut section 36b is connected to the movable sheave 32b through a thrust bearing so that the nut section 36b moves axially with the movable sheave 32b.

Between the primary pulley 31 and the secondary pulley 32, an operation shaft 160 is supported with rotation allowed. A circular gear 161 and a non-circular gear 162 are fixed on the operation shaft 160. The circular gear 161 meshes with a circular gear 35c which is fixed on the nut section 35b of the primary pulley 31, while the non-circular gear 162 meshes with a spiral shaped non-circular gear 36c fixed on the nut section 36b of the secondary pulley 32. The circular gear 161 is connected to an output gear 166a of a shifting motor 166 through two rows of gears 165 which are constituted by spur gears or helical gears. The shifting motor 166 is an electric motor, and an electromagnetic brake 167 is installed on the output shaft 166a. The electromagnetic brake 167 works when the motor 166 is in a nonelectrified condition so that the primary pulley 31 and the secondary pulley 32 are kept at a selected shifting position despite the gear rows 165 and the ball thread mechanism 35, 36 which are capable of reversible transmission.

The single planetary gear mechanism 20 is installed on the gear shaft 70a constituting the second shaft, and the ring gear 20R is connected to a flange of the output shaft 30a of the belt driven continuously variable transmission device 30. A sprocket 82 constituted on the same member on which the sun gear 20S is made is supported on the gear shaft 70a, and furthermore, the carrier 20C, which supports the pinion 20P with rotation allowed, is fixed on the gear shaft 70a.

On the other hand, a silent chain 83 is lapped around the sprocket 82 and the sprocket 81 which is supported by the low one-way clutch F. These sprockets 81, 82 and the silent chain 83 constitute the transfer device 80.

The gear shaft 70a and a gear 71a are constituted together, and the gear shaft 70a and the gear 71a constitute the output member 70, and the gear 71a meshes with a gear 71c which is fixed on an intermediate shaft 72. Further, a small gear 71d is fixed on the intermediate shaft 72, and the gear 71d meshes with a ring gear 75a which is fixed on the differential gear device 75, thereby to constitute the reduction gear device 71. Right and left front axle shafts 73 extend away from the differential gear device 75.

Operation of the embodiment is explained as follows:

The rotation of an engine crank shaft 101 is transmitted to a coupling case 43 of the starting device 100$_1$. Through a hydraulic stream, the rotation of engine crank shaft 101 is also transmitted to a turbine runner 41a from the pump impeller 42 of the hydraulic coupling 40, and is transmitted from the hub 41b to the input shaft 60. At this stage, in the starting process of the running, the rotation speed of the input shaft 60 and the hub 41b is low, so that the centrifugal force, working on the weight 52 and the shoe of the lock-up clutch 50 which is connected through the hub 41b and the slip clutch 110, is small. The lock-up clutch 50 is in a disconnected condition (refer to the lock-up OFF area K in FIG. 11), so that the rotation of the engine crank shaft is transmitted only through the hydraulic coupling 40, and the vehicle therefore starts smoothly. Once the rotation of the hub 41b reaches a certain speed (the lock-up starting point L$_1$), the frictional member 53a touches inside of the housing 43 by the centrifugal force acting on the weight 52 and the shoe 53. Due to this motion, the lock-up clutch 50 starts transmitting torque and increases torque capacity sharply (torque capacity characteristic L). Accordingly, the lock-up clutch 50 is completely connected during comparatively low speed operation (refer to L$_2$ point in FIG. 11), and fuel efficient is enhanced. On the other hand, even in the condition in which the lock-up clutch 50 is being connected, if a large load which is caused by kick-down, sudden (emergency) braking, shift-up, etc., is applied to the output side 41, or if a sharp load deviation occurs by vibration at the input side caused by engine knocking, etc., the slip clutch 110 slips, so that the above extraordinary load or vibration is smoothly absorbed (refer to slipping areas O$_2$, O$_3$). At this stage, as the slip clutch 110 has an approximately constant clutch capacity characteristic M as a function of the rate of rotation (rpm), and the abovementioned loads are securely absorbed even during high speed running, so smooth running is obtained.

At the D range and the S range, the motor 130 for the forward/reverse switching device 11a is at the home position, the forward clutch C1 is held in an engaged condition by the pressing force of the conical disc spring, while the reverse brake B2 is in a released condition. Under these conditions, the sun gear 90S and the carrier 90C of the dual planetary gear mechanism 90 rotate together, and accordingly, the ring gear 90R also rotates together, upon which this normal rotation is transmitted to the input shaft 30b of the belt driven continuously variable transmission device 30. The rotation of the input shaft 30b is transmitted to the cam mechanism 34, and transmitted to the movable sheave 31b through the stationary sheave 31a of the primary pulley 31 and the ball spline. At this moment, the cam mechanism 34 works the axial force which is proportional to the input torque applied to the input shaft 30b to the back side of the stationary sheave 31a through the disc spring installed in the cam mechanism 34, while the movable sheave 31b is kept at a given position by the ball thread mechanism 35 which determines its position based on a selected shift ratio. Consequently, a reaction force equal to the axial force is applied to the back side of the movable sheave 31b through the thrust bearing, and due to this, the primary pulley 31 holds the belt 33 by a force which is proportional to the input torque. Furthermore, rotation of the belt 33 is transmitted to the secondary pulley 32 and to the output shaft 30a. With the belt transmission being conducted, when the shifting motor 166 is operated based on the signals from sensors detecting throttle opening, vehicle speed, etc., the operation shaft 160 rotates through the gear rows 165. Because of the rotation of the shaft 160, the nut section 35b of the ball thread mechanism 35 rotates through the circular gear 161 and 35c, and the nut section 36b of the secondary pulley 32 rotates through the non-circular gear 162 and 36c. Due to these motions, relative rotation is developed between the nut sections 35b, 36b, and the bolt sections 35a, 36b which are fixed on the case 15 with no rotation allowed. Consequently, the ball thread mechanism 35, 36 moves the movable sheaves 31b, 32b through the thrust bearings so that the primary pulley 31 and the secondary pulley 32 are set to selected effective diameters, so that the predetermined torque ratio is obtained.

Furthermore, the rotation of the output shaft 30a of the belt driven continuously variable transmission device 30 is transmitted to the ring gear 20R of the planetary gear mechanism 20, and transmitted to the gear shaft 70a through the carrier 20C.

At the low speed mode L of the D range, the actuator 11b for high/low mode switching is under the condition that the motor 131 rotates by a certain amount, and stops at a certain position based on the signals sent from the control unit C. The connecting member 135 slightly moves. Under this condition, the high-clutch C2 is released, and the low coast and reverse brake B1 is released. Consequently, as shown in FIG. 6, the low one-way clutch F is in motion, and during the torque transmission from the ring gear 20R to the carrier 20C, the sun gear 20S receives a reaction force. However, the sun gear 20S is stopped by the low one-way clutch F through the transfer device 80. The single planetary gear mechanism 20 works as a reduction mechanism. Due to this, the rotation of the output shaft 30a of the belt driven continuously variable transmission device 30 is only decelerated by the single planetary gear mechanism 20, and the rotation is further decelerated through the reduction gear device 71 composed of the gears 71a and 71c, the intermediate shaft 72, the gear 71d and the gear mounting case 75a, and furthermore, the rotation is transmitted to the right and left front axle shafts 73 through the differential device 75.

When the throttle opening and the vehicle speed reach a certain value, the electric motor 131 for the high/low mode switching device 11b rotates back to the home position based on the signals from the control unit C. At this stage, the high clutch C2 is in an engaged condition, and the low coast and reverse brake B1 is in a released condition. Accordingly, a predetermined rate of rotation is transmitted to the ring gear 20R of the planetary gear mechanism 20 through the belt driven continuously variable transmission device 30, and the rotation of the input shaft 60 is transmitted to the sprocket 81 through the high clutch C2, and furthermore, is transmitted to the sun gear 20S through the transfer device 80. Due to this motion, the torque which is continuously shifted at the belt driven continuously variable transmission device 30 and the torque which is transmitted through the transfer device 80 are combined in the planetary gear mechanism 20, and the combined torque is transmitted to the gear shaft 70a from the carrier 20C. Furthermore, as stated for the previous low speed mode, the rotation transmitted to the gear shaft 70a is transmitted to the right and left front axles 73 through the reduction gear mechanism 71 and the differential device 75.

In the low speed mode L of the S range, the motor 131 of the high/low mode switching device 11b rotates based on the signals sent from the control unit C. By the ball thread mechanism 132, the connecting member 135 moves to release the clutch C2 by taking off the biasing force developed from the conical disc spring, and to engage the low coast and reverse brake B1. In this condition, the sprocket 81 is prevented from both forward and reverse rotation by the low coast and reverse brake B1, so that the rotation caused by negative torque such as engine braking, etc. is also prevented. The high speed mode of the S range is the same as that of the D range.

On the other hand, at the R range, the electric motor 130 for the forward/reverse switching device 11a is electrified by the signal from the control unit C, so the ball thread mechanism 132 rotates. The connecting means 133 is moved, then the forward clutch C1 is released, and the reverse brake B2 is engaged. At the same time, the motor 131 for the high/low mode switching device rotates, and the high clutch C2 is released, and the low coast and reverse brake B1 is engaged. In this state, in the dual planetary mechanism 90, the ring gear 90R is restrained by the reverse brake B2, the rotation of the input shaft 60 is transmitted from the sun gear 90S to the carrier 90C through the pinions 90P1, 90P2, and then the rotation is taken up from the carrier 90C as decelerated reverse rotation. Furthermore, the rotation is transmitted to the input shaft 30b of the belt driven continuously variable transmission device 30. From the sun gear 20S of the single planetary gear mechanism 20, the reaction torque works on the sprocket 81 as a reverse rotation through the transfer device 80. However, the low coast and reverse brake B1 operates to stop the movement of the sprocket 81.

Figure 2:
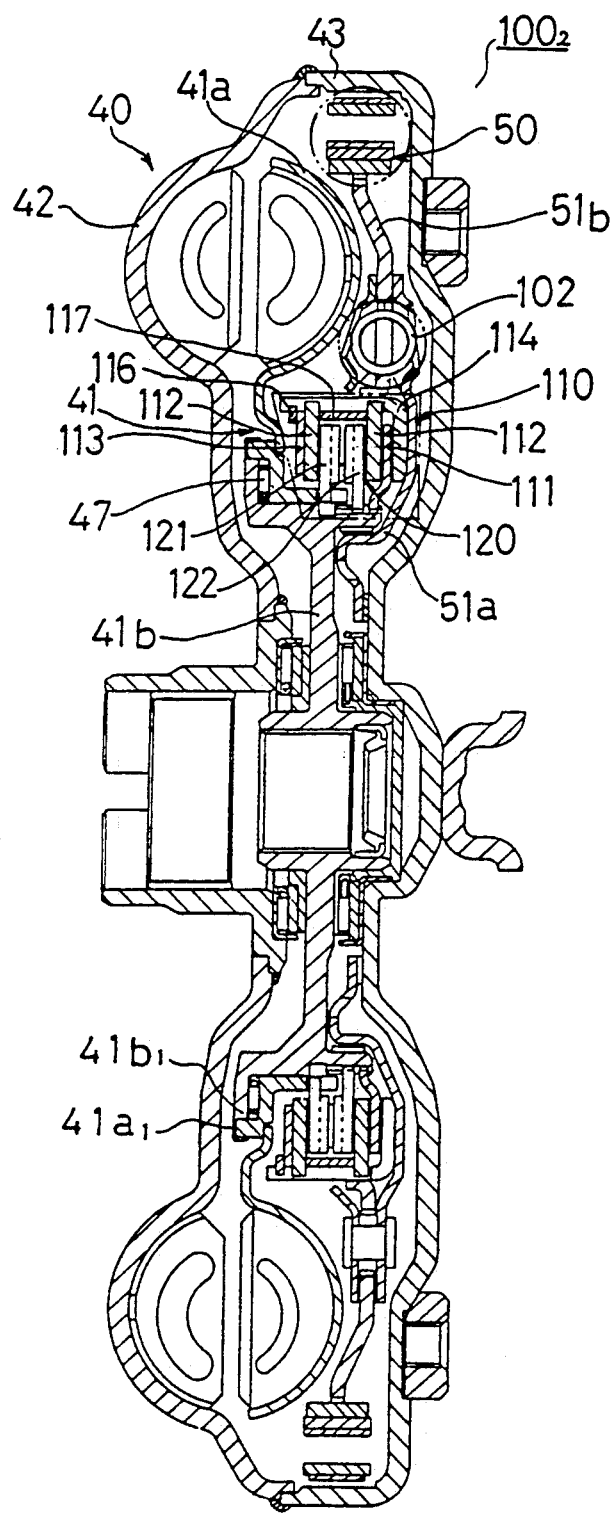
FIG. 2 is a cross-sectional view of a starting device according to another embodiment.
Figure 3:
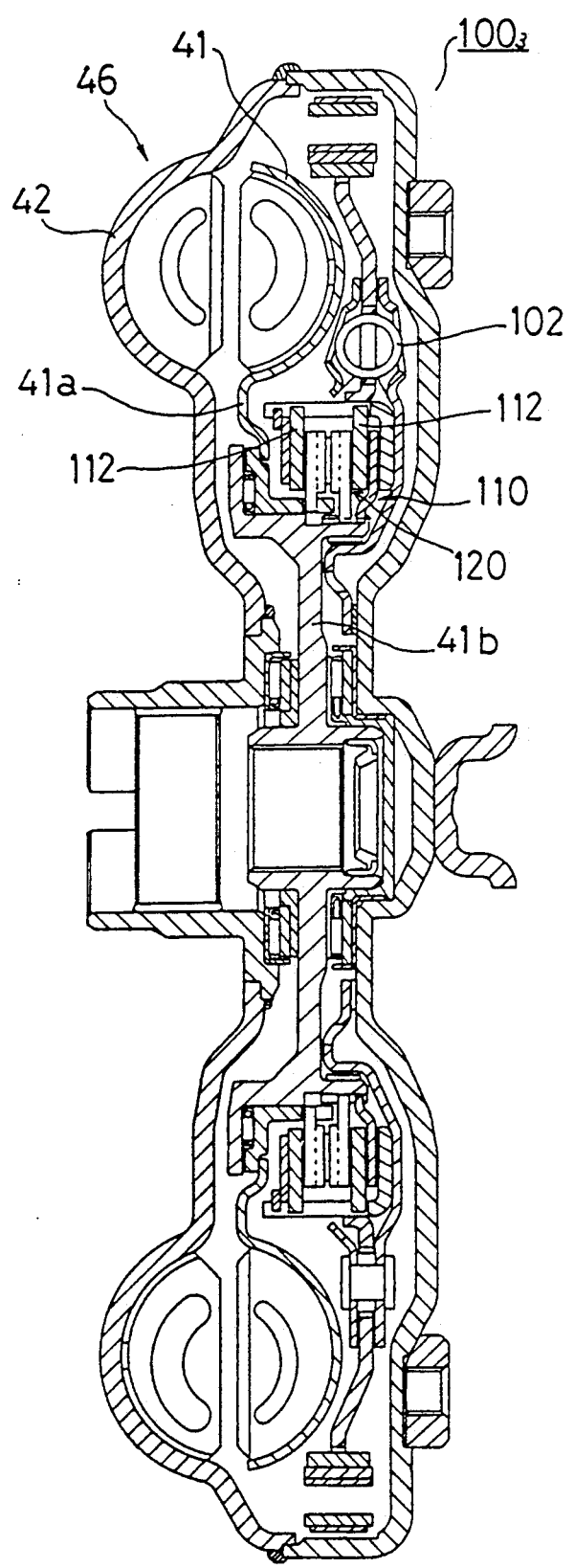
FIG. 3 is a cross-sectional view of a starting device for a further embodiment.
Figure 9:
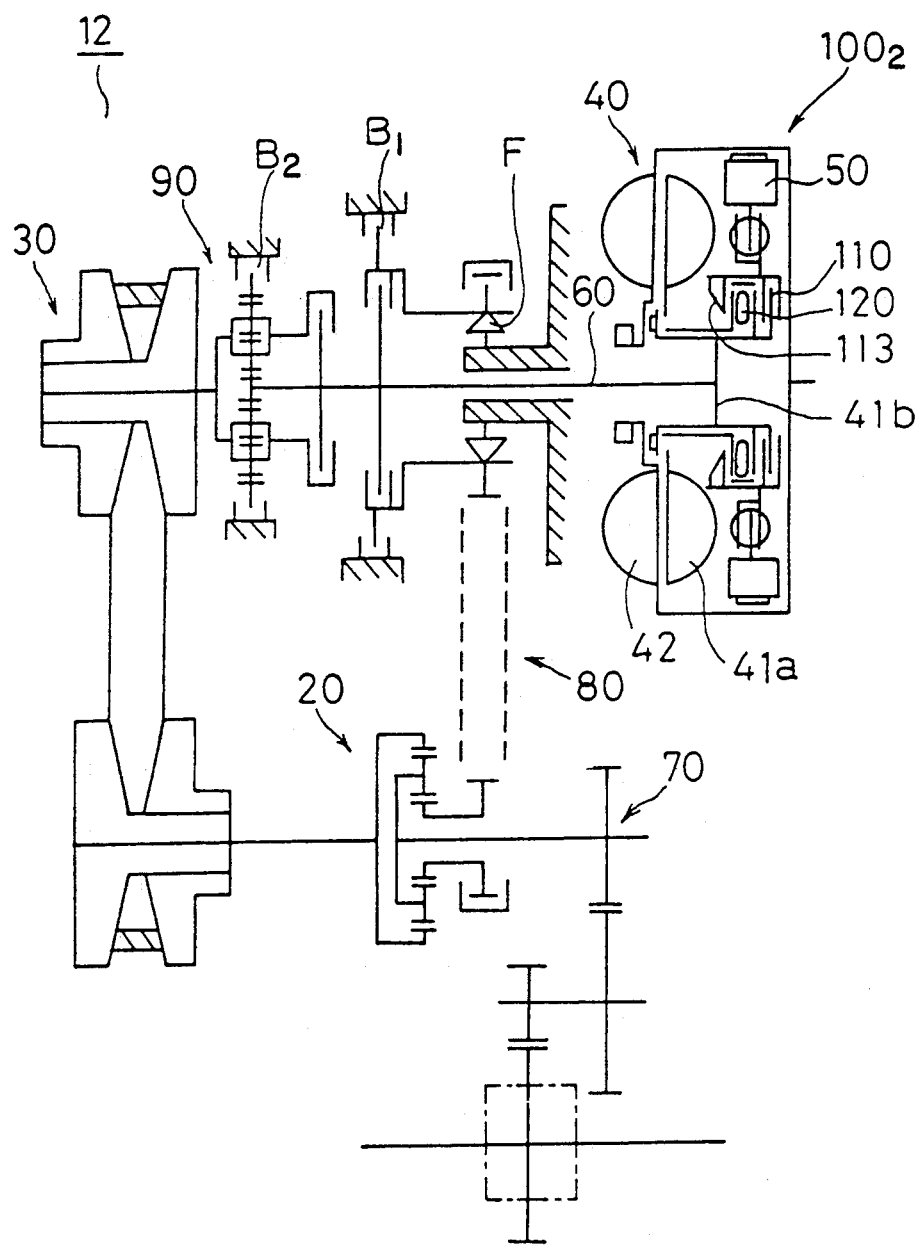
FIG. 9 is a schematic representation of the continuously variable automatic transmission having the starting device which employs the cam mechanism.

An example of the starting device $100_2$ which is partially modified shall now be described with reference to FIG. 2. This starting device $100_2$ is best suited for being installed in a continuously variable automatic transmission 12 as shown in FIG. 9.

Figure 4:
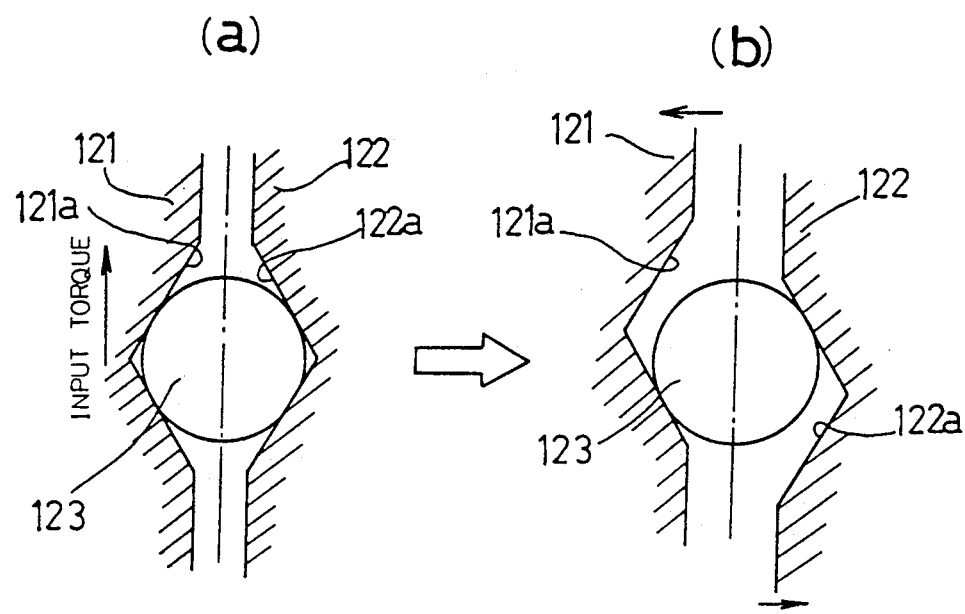
FIG. 4(a), (b) are enlarged detailed views of a cam mechanism showing a different status.
FIG. 4(c) is an enlarged detailed view of a cam mechanism having a structure different from that of FIGS. 4(a) and 4(b)
Figure 4:
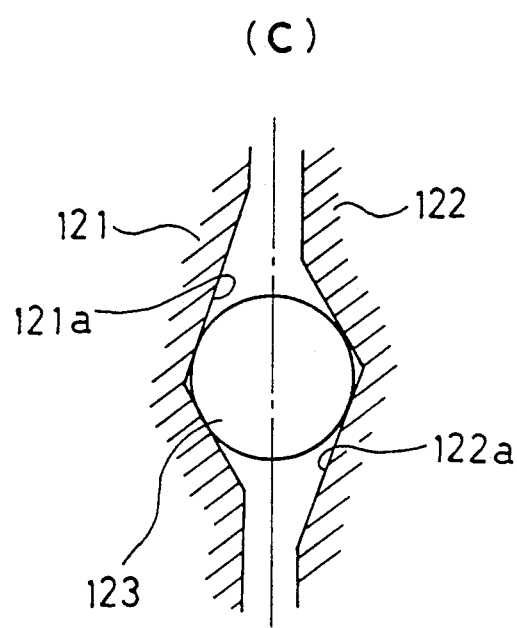
Figure 10:
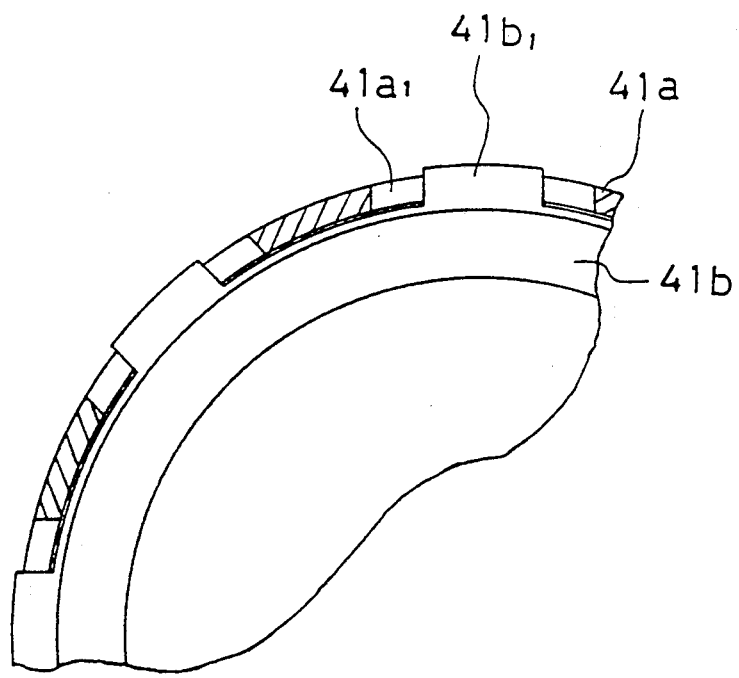
FIG. 10 is an enlarged end view of the connecting area of the turbine runner and the hub.

The starting device $100_2$ also has the hydraulic coupling 40 composed of the input side 42 and the output side 41, the centrifugal type lock-up clutch 50, the slip clutch 110 and a cam mechanism 120 which develops axial force corresponding or proportional to the applied torque, and which applies such axial force to the slip clutch 110. In other words, the cam mechanism 120 is composed of two end-face cams, namely, an operation side cam section 121 and an operated side cam section 122, and end faces of both cam sections 121, 122 have concave portions 121a, 122a, as shown in FIG. 4, between which a roller 123 is placed. The output side 41 of the hydraulic coupling 40 is divided into a turbine runner 41a and a hub 41b. Between the turbine runner 41a and the hub 41b, a bearing 47 is placed, and consequently the turbine runner 41a and the hub 41b rotate relatively to each other. As shown in FIG. 10 in detail, on the runner 41a and a hub 41b, which are adjacent to the bearing 47, a concave groove $41a_1$ and a nail $41b_1$ is provided which engage together to regulate the relative rotation to a certain amount. Because of the above structure, even if a frictional member attached to both cam sections 121 and 122 is worn, the roller 123 is prevented from riding across a convex portion of the cam surface. The operation side cam section 121 is connected to the turbine runner 41a with only sliding movement allowed, and the operated side cam section 122 is spline-coupled to the hub 41b. Furthermore, the slip clutch 110 has a clutch hub 114, two clutch plates 112 which are connected to the hub 113, a clutch disc 111 which is spline-coupled to the hub 41b, and a coned or conical disc spring 113 which is stopped by a snap ring 116 and provides a predetermined biasing force to the above plates 112 and the disc 111. Between both clutch plates 112, 112, the cam mechanism 120 is situated. A spacer 117, which keeps the space between two plates 112, 112 at a certain distance, is also provided. The clutch hub 114 is fixed on a disc 51a extending in a radial direction, and the edge of this disc 51a is supported on the hub 41b and the coupling case 43 so as to have free rotation. The top edge of the disc 51a is connected to a torsion damper 102. At the outside of this damper 102, another disc 51b is extending in a radial direction. On the top edge of this disc 51b, the centrifugal type lock-up clutch 50, the same as in the previous embodiment, is installed.

Figure 12:
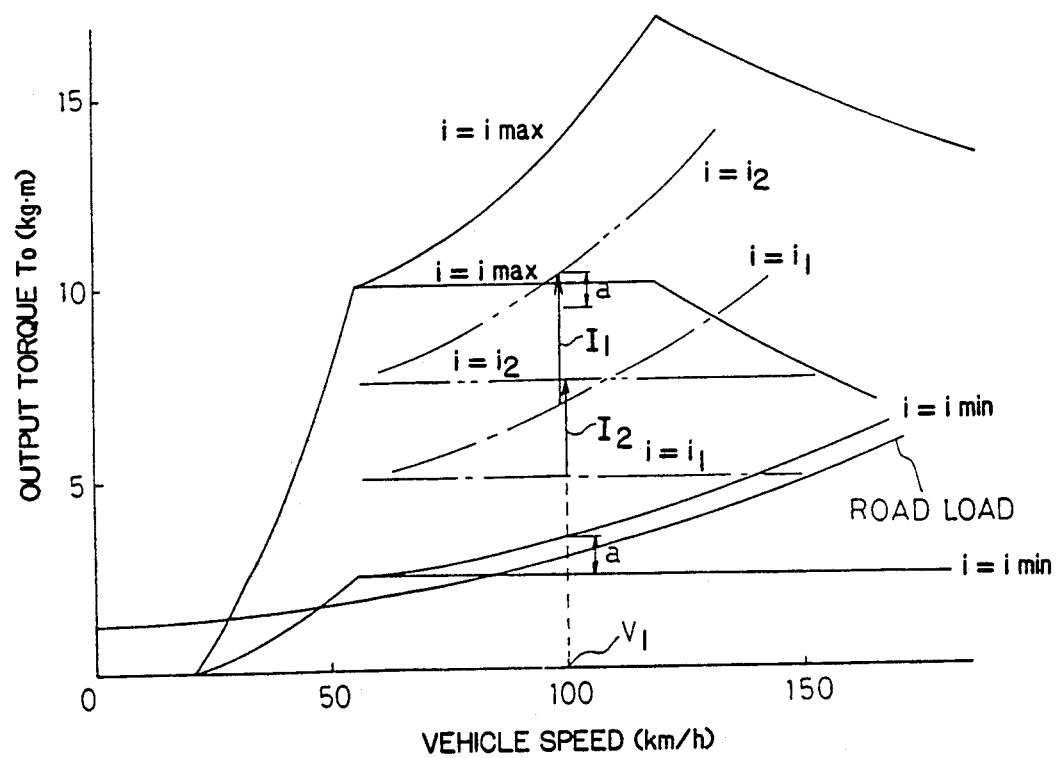
FIG. 12 is a graphical representation of the relation between vehicle speed and the output torque.

With reference to the starting device $100_2$, which is the same as the starting device $100_1$, at the area K below the lock-up starting point $L_1$ of the lock-up clutch 50, power is transmitted through the hydraulic flow of the hydraulic coupling 40, and the vehicle starts smoothly. When the speed reaches to above the point $L_1$, $L_2$, the centrifugal type lock-up clutch 50 connects, so that the rotation of the engine crank shaft 101 is transmitted to the hub 41b and the input shaft 60 through the centrifugal type lock-up clutch 50 and through the friction of the slip clutch 110 caused by the pressure of the damper 102 and the coned or conical disc spring 113. In this state, if a sudden load change occurs in transmitted torque by kickdown, up-shifting, knocking, etc., the slip clutch 110 slips (slipping area $0_2$, $0_3$), and because of this the hydraulic coupling 40, with relative rotation of the input side 42 and the output side 41, transmits power to the turbine runner 41a, the cam mechanism 120, the hub 41b and the input shaft 60. At this moment, the operation side cam 121 and the operated side cam 122 of the cam mechanism 120 rotate relative to each other in proportion to the transmitted torque, as shown in FIGS. 4(a) and (b). Deviation between the concave portions 121a, 122a caused by the above relative rotation develops an axial force. The axial force corresponding to this transmitted torque is applied to the slip clutch 110 in addition to the biasing force by the coned or conical disc spring 113. Therefore, the axial force and the biasing force of the coned or conical disc spring 113 press the clutch plates 112 and the clutch disc 111 together so that the torque capacity of the slip clutch 110 is increased corresponding to the increase of transmitted torque. Accordingly, for example, at the time of kick-down, the transmitted torque becomes zero. Soon after the transmitted torque is sharply raised, however, the slip clutch 110 slips during the sharp rise of the torque, so the sharp torque rise is absorbed, and the vehicle is smoothly accelerated. After this, the torque capacity of the slip clutch 110 increases according to the transmitted torque, and power is transmitted with less slip of the slip clutch 110 or without slip. Because of this, even in an area of high load of torque, high transmission efficiency occurs based on the centrifugal type lock-up clutch 50 with less slip of the slip clutch 110 or without slip of the clutch 110. Furthermore, as shown in FIG. 12, in the case that the lock-up clutch, as in conventional ones, has characteristic output torque vs. vehicle speed curves which have a positive inclination toward the coordinate in FIG. 12, if kick-down occurs at a certain vehicle speed $V_1$, and the total torque ratio "i" changes from $i_1$ to $i_2$, slip occurs per a straight line $I_1$. On the other hand, in this embodiment, as the slip clutch has a characteristic whose output torque vs. vehicle speed lines are parallel toward the coordinate in FIG. 12, even during slip, the amount of slip is equal to $I_2$, namely, the slip is smaller by an amount "a" which is formed by the difference: $I_1 - I_2 = a$, so that smooth kick-down is performed.

As shown in FIG. 4(c), it is possible to provide different angles for the increasing slope and the decreasing slope of the concave portions of the cam sections 121, 122 in order to develop axial forces whose characteristics are different in normal transmission and in reverse transmission.

An explanation of the embodiment is as follows:

The starting device 100₃ by this embodiment is almost the same as the starting device 100₂ of the previous embodiment having the cam mechanism 120. However, the former (100₃) differs from the latter (100₂) in that it does not have a spacer held between the two clutch plates 112 at both sides of the slip clutch 110.

Figure 13:
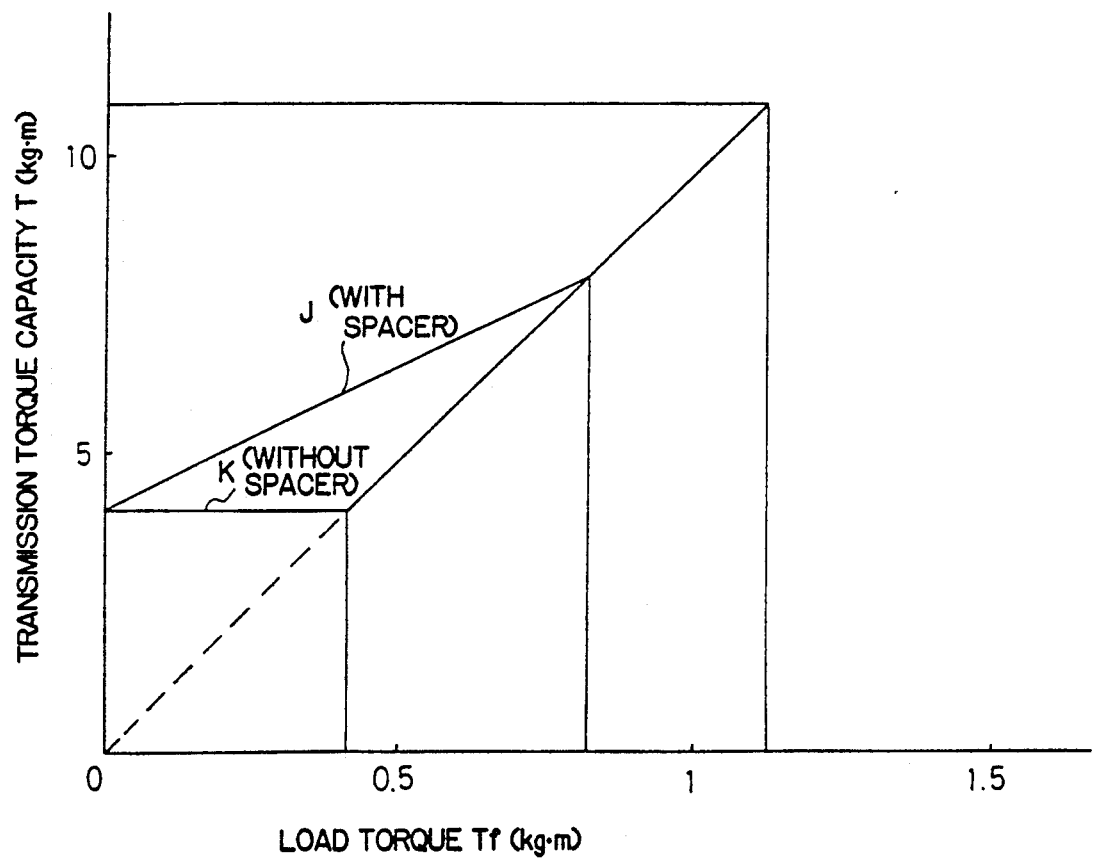
FIG. 13 is a graphical representation of the relation between the load torque and the transmitted torque capacity with the parameter of the spacer.
Figure 14:
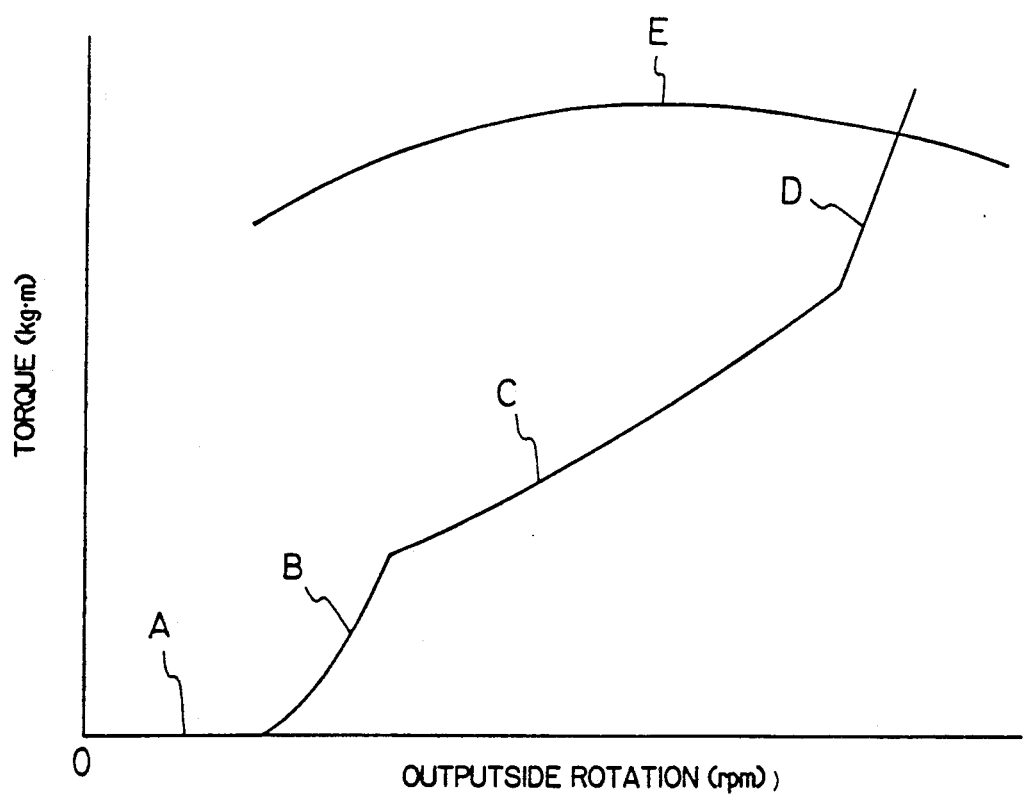
FIG. 14 is a graphical representation showing torque capacity of a conventional centrifugal type lock-up clutch.

Due to this difference, the characteristic of the biasing force developed by the cam mechanism 120 against the slip clutch 110 differs from that of the previous starting device 100₂, and the transmission torque capacity (T kg.m) corresponding to the transmitted torque (T kg.m) (refer to FIG. 13) differs.

TECHNICAL ADVANTAGES OF THE INVENTION

As explained, the slip clutch (110), which slips under the condition that the torque exceeds a predetermined value, is situated in series with the centrifugal type lock-up clutch (50), so that power is transmitted smoothly through the hydraulic coupling (40) when a vehicle starts running and the lock-up clutch (50) is connected at comparatively low speed to obtain better fuel efficiency. Furthermore, if a large load torque, caused by kick-down, engine knocking, up-shifting, etc., is applied to the lock-up clutch (50), the load torque is absorbed by slipping of the slip clutch (110). Consequently, vibration and shock are lightened and driveability is enhanced.

In a case where the slip clutch (110) has a predetermined torque capacity based on a given biasing force of the coned or conical disc spring (113), the structure of the slip clutch (110) is quite simple, and the slip clutch (110) securely slips when the load torque, which is more than a predetermined value, is applied, and vibration and shock are lightened.

In a case where a cam mechanism (120) of the type which develops an axial force corresponding to the load torque, is installed so that the slip clutch (110) has a torque capacity corresponding to the load torque, the torque capacity of the slip clutch (110) is automatically controlled in proportion to the load torque without having any complicated electric or hydraulic mechanisms. Because of this structure, when a sudden torque variation occurs, torque is automatically transmitted by the hydraulic coupling, a large load torque is absorbed, and soon after the torque capacity of the slip clutch (110) is increased to increase torque transmission of a direct coupling system (lock-up clutch), so that the lockup clutch (50) securely corresponds to any driving conditions without causing control delays, etc. Due to the foregoing, both fuel efficiency and driveability are attained securely and precisely.

Furthermore, in a case where the cam mechanism (120) is composed of the operation side cam section (121) and the operated side cam section (122), and the cam mechanism (120) is placed between two relatively movable parts of the slip clutch (110), the structure is quite simple by having the cam mechanism (120) by the side of the output side (41) of the hydraulic coupling (40), and by directly transmitting axial force developed by the cam mechanism (120) to the slip clutch (110), thereby providing a quick and secure response.

With reference to the slip clutch (110), the transmission torque capacity with regard to the load torque is easily changes by providing or not providing a spacer (117) between the clutch plates (112), (112) of the slip clutch (110).

In a case where the slip clutch (110) is contained in the case (43) for the hydraulic coupling (40) with the centrifugal type lock-up clutch (50), the resulting starting devices (100₁), (100₂), (100₃) are compact, so that the matching performance with an automatic transmission and the mounting performance on a vehicle are enhanced.

In a case where starting devices are used for a continuously variable transmission (CVT), a hydraulic coupling (including a fluid coupling) can be used, and starting devices which are economical and have secure motions are provided. Particularly where the automatic transmission (12) is all electrically controlled, the starting devices (100₁), (100₂), (100₃) are quite effective without employing a complicated hydraulic control system.

We claim:

1. A starting device for an automatic transmission of a vehicle having an engine, the transmission having an input shaft and the engine having an output shaft, comprising:

a hydraulic coupling disposed between said output shaft of said engine and said input shaft of said automatic transmission, said hydraulic coupling having an input side and an output side, said output side of said hydraulic coupling comprising a turbine runner and a hub which are rotatable relative to each other;

a lock-up clutch connecting said output shaft of said engine and said output side of said hydraulic coupling, said output side of said hydraulic coupling being connected to said input shaft of said automatic transmission;

a slip clutch connected in series with said lock-up clutch, said slip clutch being disposed between said output shaft of said engine and said output side of said hydraulic coupling, said slip clutch including a plurality of friction plates and biasing means for applying a predetermined biasing force to said plurality of friction plates to urge said friction plates together; and cam means, disposed in a power transmission path at said output side of said hydraulic coupling, for generating an axial force proportional to a torque transmitted between said power transmission path and for applying said axial force to said plurality of friction plates of said slip clutch so that said slip clutch has a torque capacity proportional to said applied torque, said cam means comprising an operating-side cam and an operated-side cam which are rotatable relative to each other, said operating-side cam being connected to said turbine runner and said operated side cam being connected to said hub.

2. A starting device according to claim 1, wherein said slip clutch comprises a clutch disc, a clutch plate, and a coned disc spring exerting a predetermined biasing force on said disc and said clutch plate.

3. A starting device according to claim 1, wherein said slip clutch includes two clutch plates, and said cam means is disposed between said two clutch plates.

4. A starting device according to claim 3, further comprising a spacer disposed between said two clutch friction plates to maintain a predetermined spacing between said clutch friction plates, and wherein said cam means is disposed between said two clutch friction plates at a location within said predetermined spacing maintained by said spacer.

5. A starting device according to claim 1, wherein said hydraulic coupling has a case which encloses said slip clutch and said lock-up clutch.

6. A starting device according to claim 1, wherein said automatic transmission is a belt driven continuously variable transmission.

7. A starting device according to claim 1, wherein said operating-side cam and said operated-side cam of said cam means are end-face cams having symmetrical recesses, and further comprising a roller disposed between said recesses so that an axial force is generated between said operating-side cam and said operated-side cam of said cam means.

8. A starting device according to claim 1, wherein said operating-side cam and said operated-side cam of said cam means are end-face cams which have asymmetrical recesses, and wherein a roller is disposed between said recesses.

9. A starting device according to claim 1, wherein said biasing means comprises a coned disc spring to generate said predetermined biasing force.

10. A starting device according to claim 1, wherein said slip clutch comprises a clutch hub connected to said output side of said lock-up clutch and a clutch disc engaged to said clutch hub at said output side of said hydraulic coupling.

11. A starting device according to claim 10, further comprising a thrust bearing disposed at said output side of said hydraulic coupling between said turbine runner and said hub.

12. A starting device according to claim 10, further comprising means for limiting relative rotation of said turbine runner and said hub, and wherein said means for limiting is disposed at said output side of said hydraulic coupling.

13. A starting device according to claim 12, wherein said means for limiting relative rotation of said turbine runner and said hub comprises a recess formed on either said turbine runner or said hub and a protrusion formed on the other one of said turbine runner and said hub, wherein said recess and said protrusion are engaged so that they allow a predetermined amount of relative rotation between said turbine runner and said hub.

14. A starting device according to claim 1, wherein said lock-up clutch is a centrifugal type lock-up clutch.

* * * * *